United States Patent [19]

Ball

[11] Patent Number: 5,492,635
[45] Date of Patent: Feb. 20, 1996

[54] SEPTIC TANK EFFLUENT FILTERING METHOD

[75] Inventor: Eric S. Ball, Winchester, Oreg.

[73] Assignee: Orenco Systems, Inc., Oreg.

[21] Appl. No.: 352,609

[22] Filed: Dec. 9, 1994

[51] Int. Cl.⁶ ......................................... B01D 37/00
[52] U.S. Cl. ...................... 210/802; 210/532.2; 210/104; 210/86; 210/340; 210/170
[58] Field of Search .............................. 210/802, 532.2, 210/521, 533, 128, 123, 138, 141, 499, 340, 253, 256, 104, 86, 170

[56] References Cited

U.S. PATENT DOCUMENTS

| | | |
|---|---|---|
| 1,902,171 | 3/1933 | Koop . |
| 2,767,801 | 10/1956 | Eads . |
| 3,612,279 | 10/1971 | Hostetter . |
| 3,662,890 | 5/1972 | Grimshaw . |
| 4,469,323 | 3/1984 | Ball . |
| 4,710,295 | 12/1987 | Zabel . |
| 4,715,966 | 12/1987 | Bowman . |
| 4,867,871 | 9/1989 | Bowne . |
| 5,207,896 | 5/1993 | Graves . |
| 5,252,000 | 10/1993 | Mohs . |

Primary Examiner—Robert A. Dawson
Assistant Examiner—Robert James Popovics
Attorney, Agent, or Firm—Chernoff, Vilhauer, McClung & Stenzel

[57] ABSTRACT

A method of filtering solids from the effluent from a wastewater collection container such as a septic tank is disclosed. A mesh screen filter is immersed in wastewater having a concentration of waste solids which have been allowed to distribute into a scum layer and a sludge layer with a horizontal layer of liquid therebetween. The filter is surrounded with a housing, and the interior surface of the housing is exposed to the horizontal layer of liquid through a plurality of apertures in the housing. Liquid from the horizontal layer flows through the apertures into the housing and thereafter the liquid flows from one side of the filter to an opposite side thereof through a mesh screen filtering surface area greater than the interior surface area of the housing. Thereafter, the liquid flows through a liquid effluent outlet of the container. This filter is very efficient and consequently provides a high quality effluent, while resisting clogging and resultant collapse of the mesh screen surface area.

13 Claims, 4 Drawing Sheets

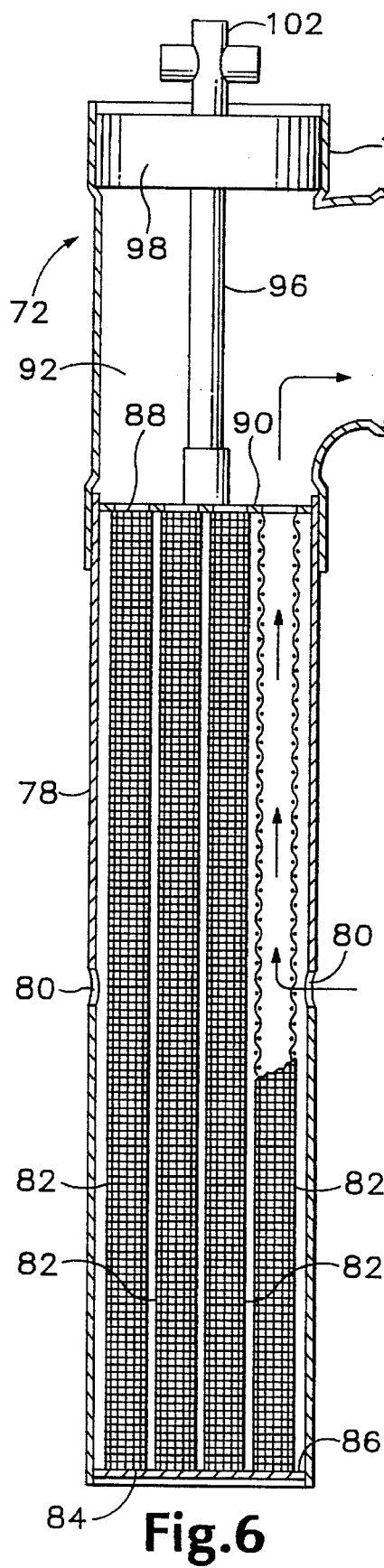
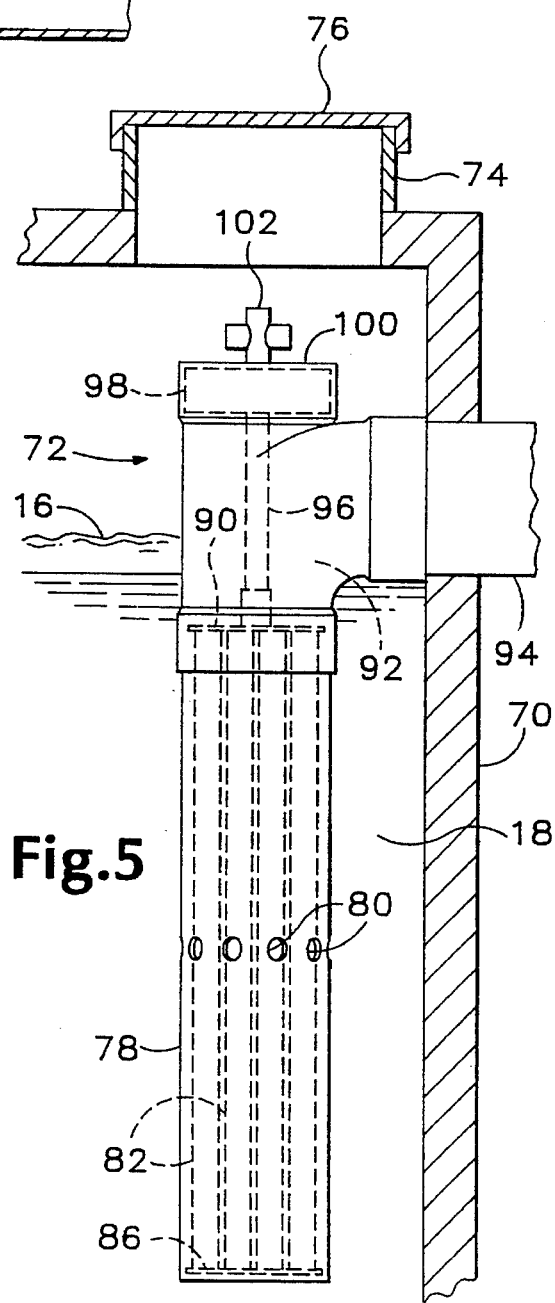
Fig.6
Fig.5

SEPTIC TANK EFFLUENT FILTERING METHOD

This invention relates to a method of treating wastewater and more particularly to a method of filtering solids from the effluent of a wastewater collection container.

BACKGROUND AND SUMMARY OF THE INVENTION

Sewage wastewater having a concentration of waste solids is typically collected in a wastewater container such as a septic tank. In the wastewater collection container the solids distribute into an upper horizontal scum layer and a lower horizontal sludge layer with a relatively clear horizontal liquid layer therebetween. Liquid from the relatively clear horizontal layer is intermittently discharged from the container as effluent, while ideally, all the solids remain in the collection container to be decomposed by the action of anaerobic bacteria. However, some solids are nevertheless discharged from a conventionally operated wastewater container because, as the decomposition of solids proceeds, gas is produced. Bubbles of product gas attach to some solids, which causes those solids to migrate from the sludge layer to the scum layer; the gas-lifted solids return to the sludge layer when the attached gas bubbles are released. These migrating solids may become entrained in the effluent discharged from the container, consequently degrading the quality of the effluent, and increasing the extent, and thus the expense, to which the effluent requires secondary treatment.

Various filtering devices have been associated with the wastewater container outlet in an attempt to prevent the discharge of solids with the liquid effluent. For example, a cylindrical mesh screen may surround a gravity flow outlet, a siphon intake or the intake of a discharge pump. Cylindrical mesh screens are shown, for example, in Graves U.S. Pat. No. 5,207,896, Grimshaw U.S. Pat. No. 3,662,890 and Ball U.S. Pat. No. 4,439,323. However, such a screen tends to become clogged with adhering solids which may even cause the screen to collapse. The clogged or collapsed screen must then be removed from the container and cleaned or replaced. As shown in Zabel U.S. Pat. No. 4,710,295, it is also known to cause the effluent to flow through the open bottom of a filtering device containing in its walls horizontally oriented elongate slots out through which the effluent flows to a gravity flow outlet of the wastewater collection container. However, such slots are still subject to clogging and they also permit horizontally oriented solids to enter the effluent flow.

Thus, a need exists for a more effective method of filtering solids from the effluent from a wastewater collection container while overcoming the problems of the prior art systems.

According to one aspect of the present invention such a need is satisfied by immersing a mesh screen filter in wastewater having a concentration of waste solids which have been allowed to distribute into a scum layer and a sludge layer with a horizontal layer of liquid therebetween, surrounding the filter with a housing, and exposing the interior surface of the housing to the horizontal layer of liquid through a plurality of apertures in the housing. Liquid from the horizontal layer flows through the apertures into the housing and thereafter the liquid flows from one side of the filter to an opposite side thereof through a mesh screen filtering surface area greater than the interior surface area of the housing. Thereafter, the liquid flows through a liquid effluent outlet of the container. This filter is very efficient and consequently provides a high quality effluent, while resisting clogging and resultant collapse of the mesh screen surface area.

According to another aspect of the invention, a filter having multiple filtering surfaces forming multiple enclosures is immersed in the wastewater and surrounded by the housing. The interior surface of the housing is exposed to the horizontal layer of liquid through a plurality of apertures in the housing. Liquid from the horizontal layer flows through the apertures in the housing and thereafter the liquid flows from one side of the filtering surface to an opposite side thereof in parallel through the multiple filtering surfaces. The multiple filtering enclosures are particularly resistant to clogging and thus to collapse, and require cleaning only as often as the container requires pumping to remove the accumulated sludge.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 5 is a partially sectional side view of another alternative embodiment of the invention.

FIG. 6 is an enlarged partially sectional view of the gravity flow outlet and tubular filtering surface shown in FIG. 5.

DETAILED DESCRIPTION OF THE PREFERRED EMBODIMENTS

Figure 1:
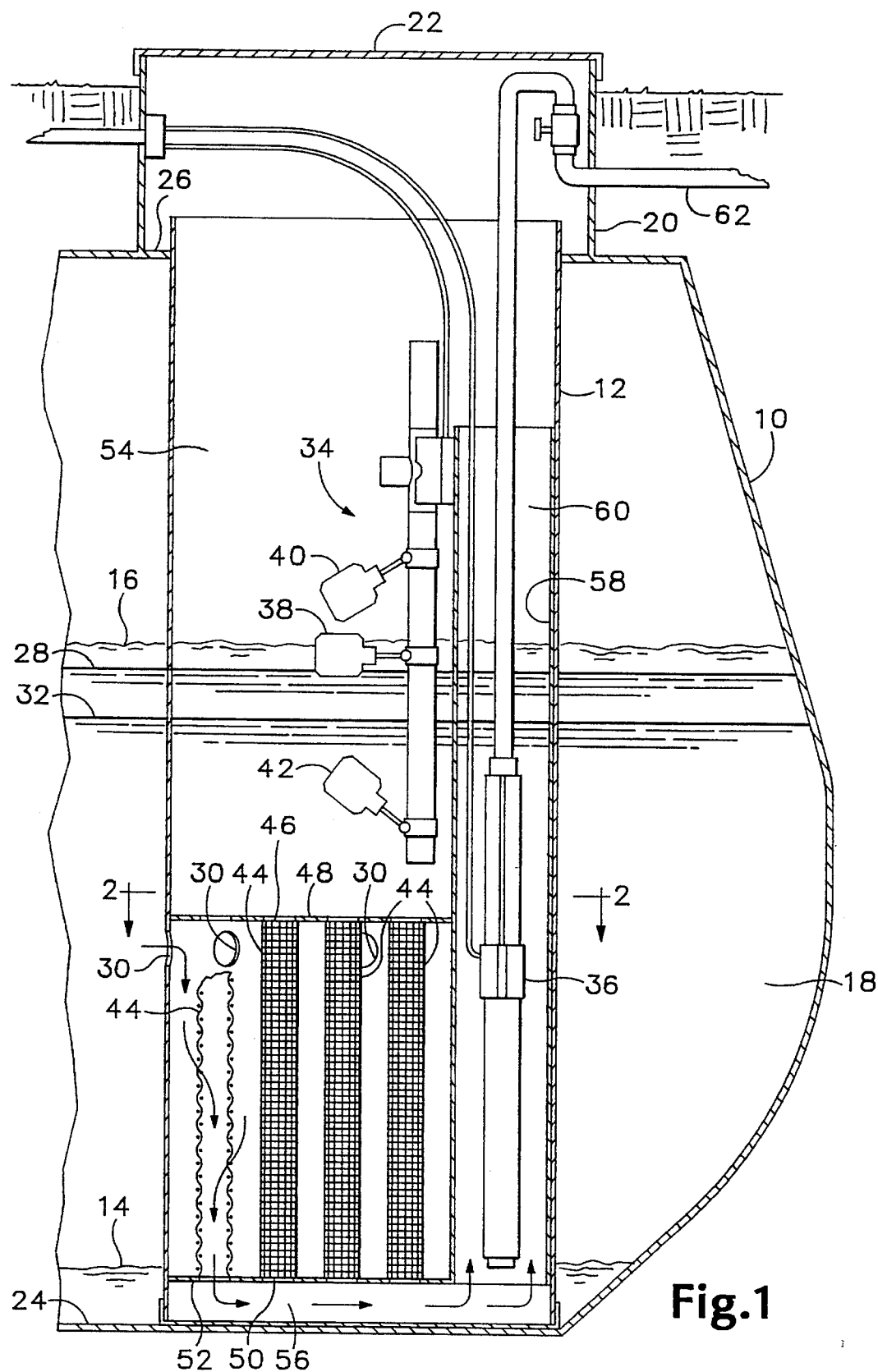
FIG. 1 is a partially sectional side view of a portion of an exemplary wastewater collection container embodying the present invention.

Referring now to an exemplary first embodiment illustrated in FIG. 1, an open-topped cylindrical housing 12 is immersed in a wastewater collection container 10 such as a septic tank receiving, typically from a residence, raw sewage wastewater having a significant concentration of waste solids. In the container the solids distribute into a lower horizontal sludge layer 14 and an upper horizontal scum layer 16 with a horizontal layer 18 of liquid therebetween. Access to the housing 12 is through a riser 20 and cover 22. The housing 12 may rest on the bottom 24 of the collection container 10 as shown, or alternatively it may include an annular collar (not shown), which rests on the top 26 of the container, for suspending the housing in the container.

The housing 12 is essentially impervious to the passage of liquid to its interior except through an encircling series of apertures 30 in the vertical wall of the housing. The open top of the housing 12 is located well above the maximum liquid level 28 in the container so no liquid will spill over the top. The location of the apertures 30 in the housing 12 corresponds with a liquid level that is about 70% of a predetermined minimum liquid level 32 in the container 10. The maximum 28 and minimum 32 liquid levels are maintained by a float assembly 34 and pump 36 which cooperate to discharge effluent incrementally in the manner described in U.S. Pat. No. 4,439,323, which is incorporated by reference herein. The float assembly 34 includes an on/off float 38, whose setting determines a maximum liquid level 28 and the minimum liquid level 32 in the container 10 under normal operating conditions, a high level alarm float 40, and a redundant off and low level alarm float 42. Thus, the apertures 30 are located in the top of the lower two-thirds of the relatively clear liquid layer 18, and will remain in the clear liquid layer as the scum layer and sludge layer gradually grow toward each other over time. The apertures 30 may vary in size, and in a preferred embodiment the apertures are circular, having a 1⅜ inch diameter.

Figure 2:
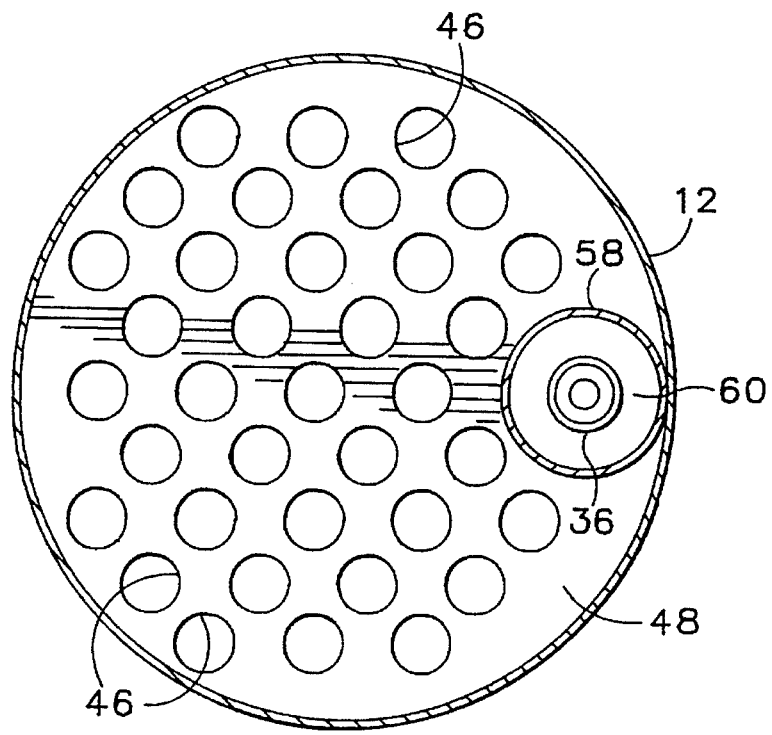
FIG. 2 is a sectional view taken along line 2—2 of FIG. 1, shown at an enlarged scale.

Multiple mesh screen tubular filter enclosures 44 are located within the housing 12 and provide a filtering surface area through which liquid entering the housing through the apertures 30 must flow before exiting the container 10 as effluent. The number and size of the tubular filter enclosures, which may be made of a polypropylene mesh screen preferably having a mesh opening about ⅛ inch square, provide a filtering surface area greater than the interior surface area of the housing 12. In the exemplary embodiment shown in FIGS. 1 and 2, each filter enclosure 44 has an open top end 46 surrounded by a top plate 48 (FIG. 2) and an open bottom end 50 surrounded by a bottom plate 52. The plates may be made of polymer such as polypropylene. The top plate 48 defines the bottom of a chamber 54 containing the float assembly 34 and the bottom plate 52 defines a chamber 56 located in the bottom of the housing 12. A vertical cylindrical casing 58 defines a chamber 60 which communicates with the bottom chamber 56 and contains the effluent pump 36.

Liquid enters the housing 12 through the apertures 30 and flows in parallel into the respective tubular filter enclosures through their surrounding mesh screens. Filtered liquid enters the chambers 54 and 56 through the open ends 46, 50 of the filter enclosures 44. When the liquid level in the housing 12 reaches the predetermined maximum level 28 the float 38 activates the pump 36 and filtered liquid effluent is pumped from the chamber 60 and through a liquid effluent outlet conduit 62. Thus, in operation, solids are excluded from the effluent, first by the apertures 30 in the vertical wall of the housing 12 and then by the filtering surfaces of the tubular filter enclosures 44. The large surface area provided by the multiple tubular filter enclosures 44 efficiently excludes from the effluent any solids which may enter the housing 12. Such solids will fall to the surface of the bottom plate 52 for degradation by anaerobic bacteria.

Figure 4:
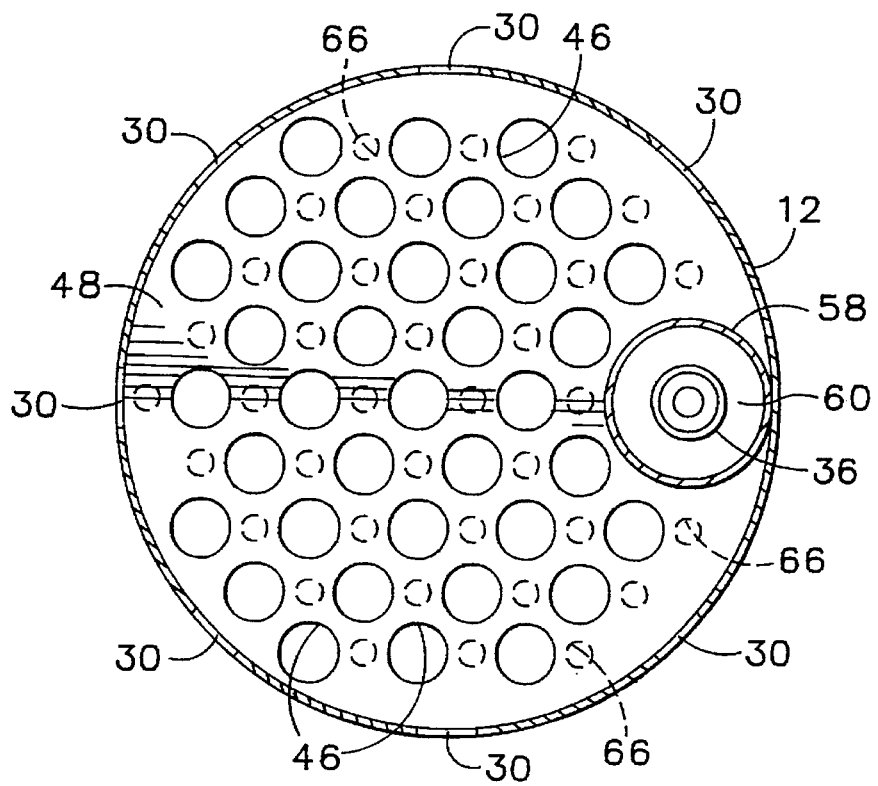
FIG. 4 is a sectional view taken along line 4—4 of FIG. 3, shown at an enlarged scale.
Figure 3:
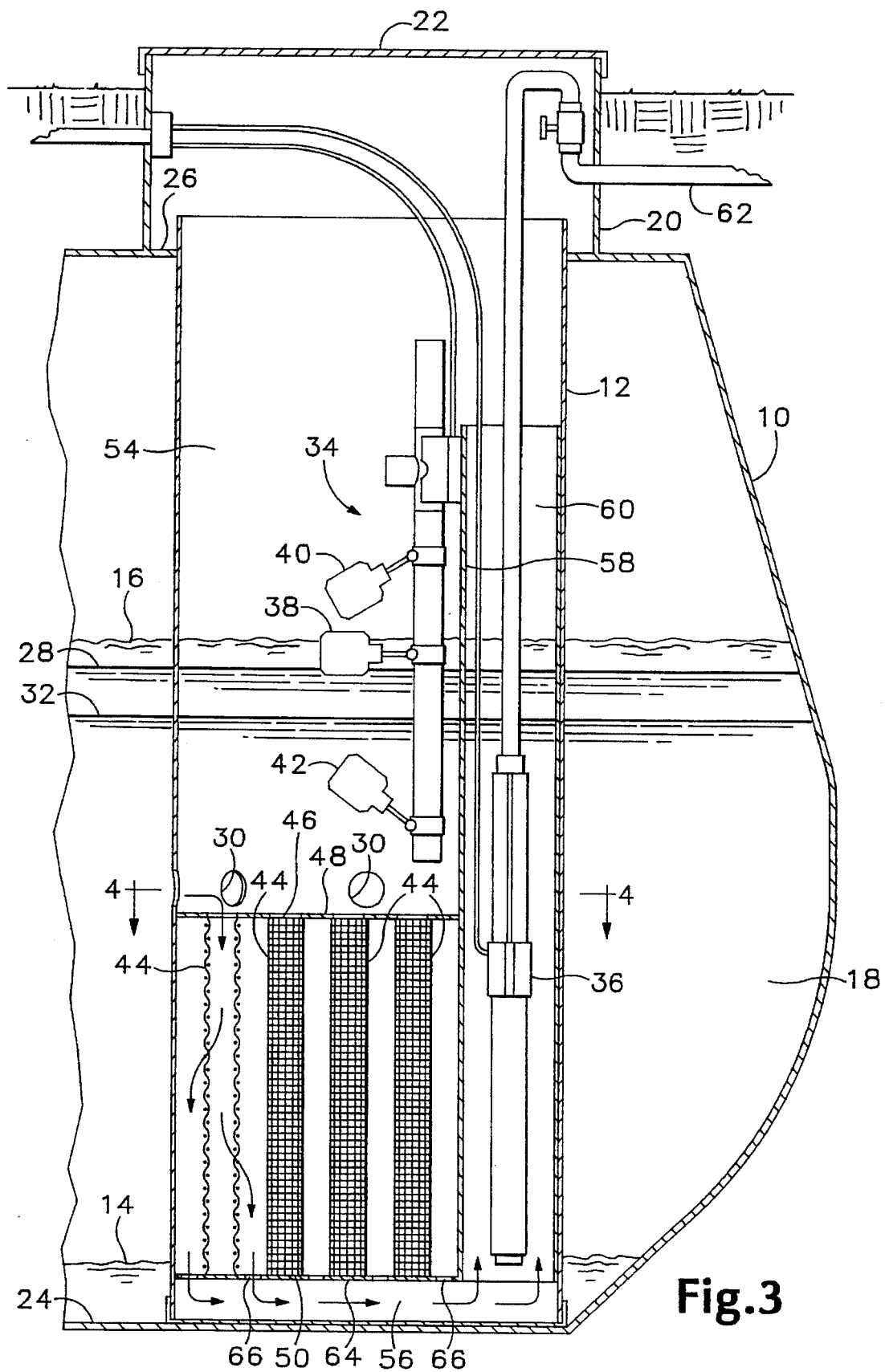
FIG. 3 is a partially sectional side view of an alternative embodiment of the invention.

As shown in FIG. 3, in an alternative embodiment of the present invention, a filtering surface area is provided so that liquid flows in parallel out of the respective tubular filter enclosures through their surrounding mesh screens. As previously described, the housing 12, which is immersed in the wastewater in the container 10, contains the float assembly 34 in the chamber 54 and the pump 36 in the chamber 60. Multiple tubular filter enclosures 44, similar to the tubular filter enclosures previously described, are surrounded by the housing 12. Each filter enclosure 44 has an open top end 46 surrounded by the top plate 48, and a closed bottom end 50 sealed by a bottom plate 64 in which it is embedded (FIG. 4). The bottom plate 64 defines the chamber 56 located in the bottom of the housing 12 and includes openings 66 located between the closed bottom ends 50 of the filter enclosures 44. The apertures 30 in the vertical wall of the housing 12 are generally located with respect to the relatively clear horizontal layer as described previously, but are above the top plate 48 to provide fluid communication between the clear liquid layer 18 and the open tops 46 of the tubular filter enclosures 44. Liquid enters the housing 12 from the clear liquid layer 18 through the apertures 30 and flows in parallel through the open tops 46 of the multiple tubular filter enclosures 44 and then through their surrounding mesh screens. The filtered liquid enters the chamber 56 through the openings 66 in the bottom plate 64, and flows into the chamber 60. When the liquid level in the housing 12 reaches the predetermined maximum level 28, the pump 36 is activated to discharge filtered liquid effluent from the container. Solids are excluded from the liquid effluent by the apertures 30 and the mesh filtering surfaces.

Filtered effluent can be discharged from a wastewater collection container through the intake of a pump such as 36 or any other incremental effluent discharge apparatus such as a siphon, or in various other ways, without departing from the present invention. FIGS. 5 and 6 illustrate a filter in accordance with the present invention for filtering the effluent discharged from a wastewater collection container 70 having a gravity flow effluent outlet 72 accessible through a riser 74 and a cover 76. A vertical portion of the outlet 72 is a housing 78 defining an encircling series of apertures 80 similar in location, in relation to the relatively clear horizontal layer of liquid, and size to the apertures 30 previously described. Multiple tubular filter enclosures 82 provide a filtering surface area in the housing 78. Each filter enclosure 82 includes a mesh screen similar to those described previously, with a closed bottom end 84 enclosed by and sealed in a bottom plate 86 and an open top end 88 surrounded by a top plate 90. The top plate 90 defines the bottom of a chamber 92 in fluid communication with a horizontal outlet conduit 94. A connecting member 96 connects the top plate 90 to a cap 98 which fits snugly in a top portion 100 of the outlet 72. A handle 102, attached to the cap 98, is accessible through the riser 74, and an extension (not shown) is attachable to the handle 102 to extend the handle into the riser if desired. Each plate 86, 90 has a diameter only slightly smaller than the inside diameter of the housing 78 so that when the plates are inserted into the housing, liquid generally enters the housing only through the apertures 80. As shown, the liquid flows into the tubular filter enclosures 82 through their surrounding mesh screens, although it will be understood that the housing and the filtering surfaces could be constructed similar to the apparatus shown in FIG. 3 so that the liquid would flow out of the filter enclosures through the mesh screens.

In operation, liquid flows from the relatively clear horizontal layer 18 through the apertures 80 in the housing 78 and thereafter in parallel through the multiple tubular filter enclosures 82 to the chamber 92. Filtered effluent flows through the chamber 92 to the liquid effluent outlet conduit 94. Any solids entering the housing 78 are excluded from the effluent by the filtering surfaces and fall to the bottom plate 86 for digestion by anaerobic bacteria. The filtering surfaces are readily removed from the housing 78 for inspection or cleaning by removing the cover 76 from the riser 74, grasping the handle 102 and lifting the filter assembly from the container 70.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating wastewater, comprising:

(a) flowing wastewater having a concentration of waste solids into a wastewater collection container and allowing said solids to distribute into a lower horizontal sludge layer and an upper horizontal scum layer with a horizontal layer of liquid therebetween;

(b) immersing a mesh screen filter, having a mesh screen surface area, in said wastewater within said container;

(c) surrounding said filter with a housing within said container, said housing having an interior surface area the totality of which is less than the totality of said mesh screen surface area, and exposing the interior surface area of said housing to said horizontal layer of liquid through a plurality of apertures in said housing;

(d) flowing liquid from said horizontal layer through said apertures into said housing and thereafter flowing said liquid from one side of said filter to an opposite side thereof through said mesh screen surface area; and (e) thereafter flowing said liquid through a liquid effluent outlet of said container.

2. The method of claim 1 wherein said mesh screen surface area comprises multiple mesh screen enclosures, and step (d) includes flowing said liquid in parallel through said enclosures.

3. The method of claim 2 wherein step (d) includes flowing said liquid in parallel into said enclosures through said mesh screen surface area.

4. The method of claim 2 wherein step (d) includes flowing said liquid in parallel out of said enclosures through said mesh screen surface area.

5. The method of claim 2 including, during step (d), separating the liquid within each of said enclosures from the liquid within the others of said enclosures by separating said enclosures from one another by means of said mesh screen.

6. The method of claim 1 wherein step (e) comprises flowing said liquid intermittently through said liquid effluent outlet.

7. The method of claim 1, including removing said filter from said housing while said housing remains within said container.

8. A method of treating wastewater, comprising:

(a) flowing wastewater having a concentration of waste solids into a wastewater collection container and allowing said solids to distribute into a lower horizontal sludge layer and an upper horizontal scum layer with a horizontal layer of liquid therebetween;

(b) immersing a filter, having multiple filtering surfaces forming multiple enclosures, in said wastewater within said container;

(c) surrounding said filter with a housing within said container, said housing having an interior surface, and exposing the interior surface of said housing to said horizontal layer of liquid through a plurality of apertures in said housing;

(d) flowing liquid from said horizontal layer through said apertures in said housing and thereafter flowing said liquid from one side of said filter to an opposite side thereof in parallel through said multiple filtering surfaces and through said multiple enclosures;

(e) during step (d), separating the liquid within each of said enclosures from the liquid within the others of said enclosures by separating said enclosures from one another by means of said filtering surfaces; and (f) thereafter flowing said liquid to a liquid effluent outlet.

9. The method of claim 8 wherein step (d) includes flowing said liquid in parallel into said enclosures through said filtering surfaces.

10. The method of claim 8 wherein step (d) includes flowing said liquid in parallel out of said enclosures through said filtering surfaces.

11. The method of claim 8 wherein step (f) comprises flowing said liquid intermittently through said liquid effluent outlet.

12. The method of claim 8, including removing said filter from said housing while said housing remains within said container.

13. The method of claim 8, wherein said multiple filtering surfaces have a total surface area, and said housing has a total interior surface area less than said total surface area of said multiple filtering surfaces.

\* \* \* \* \*